United States Patent
Kuo et al.

(10) Patent No.: US 6,273,998 B1
(45) Date of Patent: Aug. 14, 2001

(54) PRODUCTION OF PAPER AND PAPERBOARD

(75) Inventors: Lawrence Lu Kuo, Columbia; Roger Yiming Leung, Ellicott City; Steven R. Prescott, Columbia, all of MD (US); Thord Hassler, Helsingborg (SE)

(73) Assignee: Betzdearborn Inc., Trevose, PA (US)

( * ) Notice: Subject to any disclaimer, the term of this patent is extended or adjusted under 35 U.S.C. 154(b) by 0 days.

(21) Appl. No.: 08/291,309

(22) Filed: Aug. 16, 1994

(51) Int. Cl.$^7$ .................................................. D21H 21/10

(52) U.S. Cl. ................................... 162/168.2; 162/168.3; 162/181.1; 162/181.6; 162/181.8; 162/183

(58) Field of Search ............................. 162/168.2, 168.3, 162/181.6, 181.8, 164.1, 164.6, 168.1, 183

(56) References Cited

U.S. PATENT DOCUMENTS

| | | | |
|---|---|---|---|
| 4,421,602 | 12/1983 | Brunnmueller et al. ........ | 162/168.2 |
| 4,749,444 | 6/1988 | Lorz et al. ................ | 162/168.3 |
| 4,772,359 | 9/1988 | Linhart et al. ............. | 162/163 |
| 4,774,285 | 9/1988 | Pfohl et al. ............... | 525/60 |
| 4,880,497 | 11/1989 | Pfohl et al. ............... | 162/135 |
| 4,913,775 | 4/1990 | Langley et al. ............. | 162/164.3 |
| 4,957,977 | * 9/1990 | Itagaki et al. ............. | 525/328.4 |
| 4,969,976 | 11/1990 | Reed ....................... | 162/164.3 |
| 4,978,427 | 12/1990 | Pfohl et al. ............... | 162/168.2 |
| 5,015,334 | 5/1991 | Derrick et al. ............. | 162/168.1 |
| 5,064,909 | 11/1991 | Itagaki et al. ............. | 525/340 |
| 5,098,521 | 3/1992 | Freudenberg et al. ......... | 162/168.2 |
| 5,145,559 | 9/1992 | Auhorn et al. .............. | 162/168.2 |
| 5,167,766 | * 12/1992 | Honig et al. .............. | 162/164.1 |
| 5,324,792 | 6/1994 | Ford ....................... | 525/378 |
| 5,389,203 | * 2/1995 | Sawayama et al. ........... | 162/168.2 |

FOREIGN PATENT DOCUMENTS

| | | | |
|---|---|---|---|
| 0235893 | 9/1987 | (EP) ................. | D21D/3/00 |
| 0528409 | 2/1993 | (EP) ................. | C08F/8/48 |
| 9207141 | 4/1992 | (WO) ................ | D21H/17/45 |

* cited by examiner

Primary Examiner—Peter Chin
(74) Attorney, Agent, or Firm—Richard A. Paikoff; Gary A. Samuels

(57) ABSTRACT

A drainage/retention aid comprising a combination of
a) microparticles; and
b) a vinylamine copolymer having the general structure:

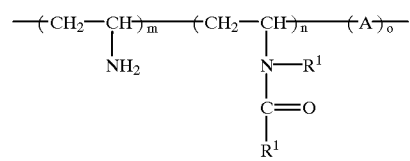

wherein m is from 1–99 mol %, n is from 0 to 50 mol % and o is from 1 to 99 mol %; A is selected from the group consisting of one or more repeating units having the following general structures:

(i)

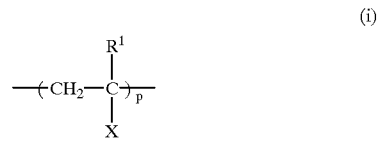

(ii)

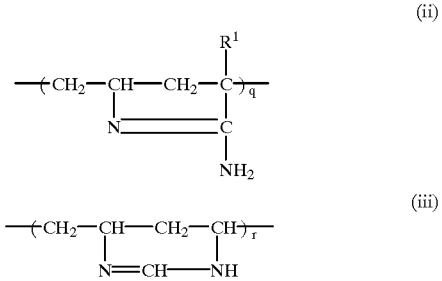

(iii)

and salts thereof wherein p, q and r are mol percentages from 1 to 99, each $R^1$ is independently H or $CH_3$, and
X is —CN, —COOR$^2$, —CONR$^3$R$^4$, —OR$^5$, —OCOR$^6$,

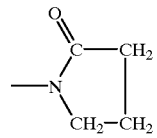

and mixtures thereof; wherein $R^2$, $R^3$, $R^4$, $R^5$, $R^6$ are independently selected from H or $C_1$ to $C_4$ alkyl; and wherein the vinylamine copolymer has a charge density in a range of from 2 to 24 mEq/g.

13 Claims, No Drawings

PRODUCTION OF PAPER AND PAPERBOARD

FIELD OF THE INVENTION

This invention relates to the use of water-soluble vinylamine copolymers in paper making processes and more particularly to their use in combination with organic or inorganic microparticles as novel retention and drainage aids in papermaking systems.

BACKGROUND OF THE INVENTION

The manufacture of paper or paperboard involves the processing of an aqueous pulp fiber suspension, often referred to as the "furnish" to produce a uniform dry paper sheet. Numerous additives are used to treat the furnish which affect the final sheet properties of the finished paper. For example, pigments, sizing agents, fillers, and the like are commonly added to the furnish to improve brightness, opacity, color and/or ink receptivity. Other common additives include starches, polymers, china clay, titanium dioxide, optical brighteners, and the like.

Retention is a term used in papermaking to denote the extent to which the pulp fibers, contaminants and papermaking additives which are added to the furnish are retained in the finished paper. The retention of pulp fibers, sizing agents, fillers, anionic trash, other anionic contaminants from recycle paper and/or other additives in the paper sheet during its formation in a paper making machine is an important requirement to paper makers. A retention aid generally acts by increasing the flocculating tendency of the pulp fibers, contaminants and additives to inhibit their loss during drainage through the paper machine wires or screens. A high degree of retention is advantageous; however, too strong flocculation may be disadvantageous as it may result in poor paper appearance.

Numerous factors affect the efficiency of retention aids including 1) variables in the furnish such as pH, consistency, temperature, type of pulp fiber (e.g., fiber length, degree of refining, etc.), accumulation of contaminants and white water recirculation (e.g. degree of system closure), 2) conditions of the wire or screens such as wire mesh size, machine speed, etc. and 3) factors relating to the additives such as the dosage amount of additives, order of additives, form, shape and density of particles and ionic balance.

Another papermaking requirement that often conflicts with retention is the need for rapid drainage of the aqueous pulp suspension in the sheet forming areas of a paper machine. Aqueous pulp suspensions (i.e. the furnish) contain more than 99% water. To convert an aqueous pulp suspension to a finished paper sheet requires a rapid reduction in water content to a level of about 6%. Water removal is generally effected in three stages, a gravity or vacuum stage, a pressing stage, and a drying stage. The first stage in this process is commonly referred to as the formation stage which is where water is removed from aqueous pulp suspension, containing fibers and additives, using a wire screen. Drainage and retention aids are used to aid in water removal during this stage of the process. Dryness is typically in the order of about 20% after the formation stage. Water drainage rate during formation is dependent upon numerous factors including the arrangement of the drainage elements in the paper making machine, (e.g., arrangement of free drainage areas vis-a-vis vacuum assistance area), characteristics of the wires, screens or fabric, furnish characteristics (e.g. freeness, additives, etc.), furnish thickness, temperature, furnish consistency and wire speed. Suitable retention/drainage aids must not only inhibit the undue loss of fibers and additives, but they must also promote rapid drainage of water from the pulp suspension. Numerous retention/drainage aids are known and are available to paper makers.

For example, EP 235,893 describes the use of a combination of organic, substantially linear synthetic polymers and bentonite to improve drainage/retention. Suitable organic polymers are those which provide a bridging mechanism for flocculation. Suitable polymers in this reference require charge densities from 0.35 to 2.5 mEq/g, and molecular weights above 500,000, preferably above 1 million and often above 5 million, most preferably in the range 10 to 30 million or more. However, these high molecular weight polymers are provided to paper makers in the form of a solid material or in emulsion form. The solid form of high molecular weight polymers are generally slow to dissolve in aqueous systems. In addition, these high molecular weight polymers are very shear-sensitive, which presents significant handling and quality control problems. For example, the polymers must be pre-dissolved in an aqueous solution, which requires extensive mixing to assure complete dissolution. However, since these polymers are sensitive to shearing, these mixing procedures often destroy the desirable high molecular weight characteristics as well as overall uniformity of the final polymeric dispersion. In consideration of these problems, investigations into the use of lower molecular weight polymers for use as flocculating agents have been made, however, current low molecular weight polymers e.g., below 500,000 molecular weight, have been found to be relatively ineffective flocculating agents.

U.S. Pat. No. 4,749,444 discloses a process for production of paper and cardboard by adding to the paper stock a three component mixture of an activated bentonite, a cationic polyelectrolyte, having a charge density not less than 4 mEq/g, and a high molecular weight acrylamide or methacrylamide polymer having an average molecular weight from 1 to 20 million. This reference discloses that if only bentonite and cationic polyelectrolyte are used, the drainage of the paper stock is poor and if only bentonite and high molecular weight polymer are used, the paper stock flocculates to such an extent that satisfactory sheet formation is not ensured. Thus, in accordance with this reference effective flocculation for drainage/retention purposes, requires the presence of bentonite, a cationic polyelectrolyte and a high molecular weight (meth) acrylamide polymer.

U.S. Pat. No. 5,098,521 describes a process for paper and paperboard production which uses a paper stock which contains anionically charged foreign substances and comprises adding to the paper stock N-vinylamide/vinylamine copolymers having less than 10% vinylamine units and having K values of not less than 130 (as determined according to H. Fikentscher).

U.S. Pat. No. 4,880,497 to Pfohl et al discloses a process for making paper having high dry and wet strength which comprises applying to a paper sheet a hydrolyzed copolymer formed by copolymerizing (a) N-vinylformamide with (b) an ethylenically unsaturated monomer selected from the group consisting of vinyl acetate, vinylpropionate, $C_1$–$C_4$ alkyl vinyl ethers, N-vinylpyrrolidone and esters, nitriles and amides of acrylic acid and methacrylic acid.

U.S. Pat. No. 4,808,683 to Itaqaki et al discloses vinylamine copolymers of N-vinylamine and comonomers having the structure

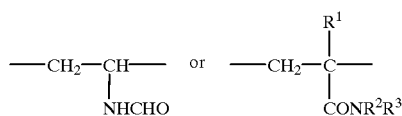

wherein $R^1$ is hydrogen or methyl, $R^2$ is hydrogen or $C_1$ to $C_4$ alkyl, and $R^3$ is $C_1$ to $C_4$ alkyl or a $C_4$ to C8 oxoalkyl group.

European patent application, publication No. 0 528 409 A, discloses cationic polymer flocculating agents having an amidine structure prepared from copolymerizing vinylformamide and acrylonitrile and heating in the presence of a strong acid to hydrolyze the polymers and form the amidine structure.

U.S. Pat. No. 5,324,792 to Ford discloses amine functional polymers which are terpolymers containing units of amidine or amidinium formate, N-vinylformamide and either vinylamine or vinylammonium formate.

SUMMARY OF THE INVENTION

It is an object of this invention to provide a novel drainage/retention aid for use in papermaking systems.

It is another object of this invention to provide a novel method of preparing paper or paperboard from aqueous pulp suspensions with a novel drainage/retention aid.

It is another object of this invention to provide a novel paper and paperboard product.

In accordance with the present invention, there has been provided a drainage/retention aid comprising a combination of
a) microparticles; and
b) a vinylamine copolymer having the general structure:

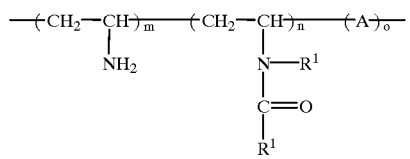

wherein m is from 1–99 mol %, n is from 0 to 50 mol % and o is from 1 to 99 mol %; A is selected from the group consisting of one or more repeating units having the following general structures:

(i)
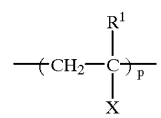

(ii)
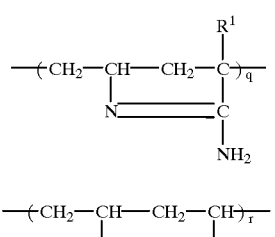

(iii)
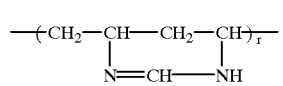

and salts thereof; wherein p, q and r are mol percentages from 1 to 99, each $R^1$ is independently H or $CH_3$, and X is —CN, —COOR$^2$, —CONR$^3$R$^4$, —OR$^5$, —OCOR$^6$,

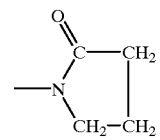

and mixtures thereof; wherein $R^2$, $R^3$, $R^4$, $R^5$, $R^6$ are independently selected from H or $C_1$ to $C_4$ alkyl; and wherein the vinylamine copolymer has a charge density in a range of from 2 to 24 mEq/g.

Also in accordance with the present invention, there has been provided a method for the production of paper or paperboard from an aqueous pulp suspension which comprises adding to the pulp suspension a drainage/retention aid which further comprises:
a) microparticles; and
b) a vinylamine copolymer having the general structure:

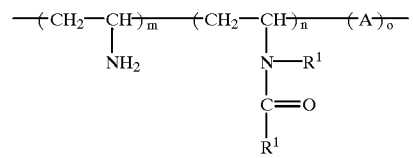

wherein m is from 1–99 mol %, n is from 0 to 50 mol % and o is from 1 to 99 mol %; A is selected from the group consisting of one or more repeating units having the following general structures:

(i)
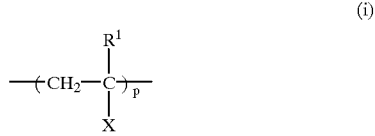

(ii)
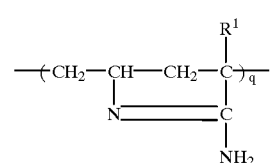

(iii)
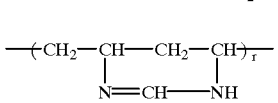

and salts thereof; wherein p, q and r are mol percentages from 1 to 99, each $R^1$ is independently H or $CH_3$, and X is —CN, —COOR$^2$, —CONR$^3$R$^4$, —OR$^5$, —OCOR$^6$,

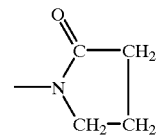

and mixtures thereof; wherein $R^2$, $R^3$, $R^4$, $R^5$, $R^6$ are independently selected from H or $C_1$ to $C_4$ alkyl; and wherein the vinylamine copolymer has a charge density in a range of from 2 to 24 mEq/g.

Also in accordance with the present invention, there has been provided a paper or paperboard product containing a drainage/retention aid comprising;

a) microparticles; and
b) a vinylamine copolymer having the general structure:

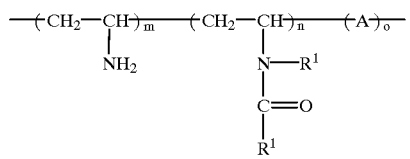

wherein m is from 1–99 mol %, n is from 0 to 50 mol % and o is from 1 to 99 mol %; A is selected from the group consisting of one or more repeating units having the following general structures:

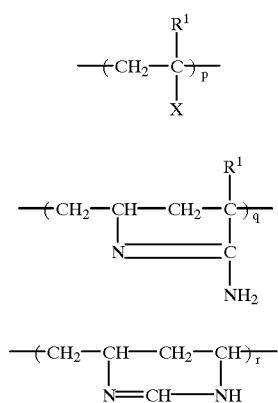

and salts thereof; wherein p, q and r are mol percentages from 1 to 99, each $R^1$ is independently H or $CH_3$, and X is —CN, —$COOR^2$, —$CONR^3R^4$, —$OR^5$, —$OCOR^6$,

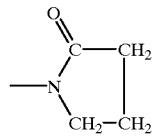

and mixtures thereof; wherein $R^2$, $R^3$, $R^4$, $R^5$, $R^6$ are independently selected from H or $C_1$ to $C_4$ alkyl; and wherein the vinylamine copolymer has a charge density in a range of from 2 to 24 mEq/g.

DETAILED DESCRIPTION

The present invention is directed to the use of water-soluble vinylamine copolymers in combination with microparticles as drainage/retention aids in paper or paperboard manufacturing processes. The combination of a high molecular weight polymeric flocculating agent together with microparticles is often referred to as a "microparticle" system. The compositions of the present invention are directed to novel microparticle systems which provide not only enhanced drainage/retention over prior known drainage/retention aids, but also provide drainage/retention aids which do not have the handling problem of the prior art high molecular weight materials.

Suitable microparticles for use in this invention generally include organic polymeric particles and/or inorganic colloidal particles having positively or negatively charged surfaces. As used herein, the terminology "charged surface" refers to a cationic, anionic or amphoteric surface charge.

The charge density of this surface charge is not, per se, critical to the invention, provided of course that the microparticles interact with either the cationic polymers of the invention or the anionic components which are present in the aqueous pulp suspension. It is preferred to use anionic (negatively charged) microparticles for use in combination with the cationic polymers of the invention.

Suitable organic polymeric microparticles for use in the invention include organic polymeric microparticles which are either water dispersible or colloidally water soluble, and have a charged surface. Organic polymeric microparticles having the above properties include, but are not limited to, various high molecular weight, cross-linked polymer particles. An example of suitable organic polymeric microparticles are those commercially available from Cytec Industries under the trademark name of POLYFLEX™. These organic polymeric microparticles are more fully disclosed in U.S. Pat. Nos. 5,171,808 and 5,274,055 which are incorporated herein in their entirety.

Suitable inorganic particles for use in this invention are generally inorganic colloidal materials having positively or negatively charged surfaces and include, but are not limited to, particulate siliceous materials, alumina, zirconium, tin, barium, and the like, and mixtures thereof. The particulate siliceous materials can be selected from water swellable clay materials, colloidal silica solutions, or water dispersible siliceous materials. The water swellable clay materials are primarily smectite or vermiculite type, and are preferably the bentonite type materials. The term "bentonite" generally embraces the sheet silicates that are swellable in water. These are primarily the clay mineral montmorillonite and similar clay minerals, e.g. hectorite, nontronite, saponite, volkonskoite, sauconite, beidellite, allevardite illite, halloysite, attapulgite and sepiolite. If water swellability is not a natural property of the mineral, it may be activated before being used, i.e., converted to its water-swellable sodium, potassium, lithium, ammonium or hydroxonium form.

Suitable inorganic particles for use in this invention also include "modified" inorganic particles wherein the ionicity of the inorganic particles has been modified by contacting the particles with a low molecular weight (e.g. below 100,000), high charge density (e.g. at least 4 mEq/g) anionic polymer. This technique is more fully disclosed in U.S. Pat. No. 5,015,334 to Derick which is incorporated herein by reference in its entirety. A preferred modified inorganic particle for use in this invention is a modified bentonite material which is modified with a low molecular weight acrylic or methacrylic polymer.

The particle size of the microparticles of this invention is not, per se, critical to the invention provided of course that these particles can be dispersed into an aqueous pulp'suspension in a paper making process and which do not negatively affect the surface characteristics of the final paper product. These particles, in general, will have an average dry particle size of less than 100 microns, typically in the range of from 1 nm to 50 microns, and more typically from 2 nm to 25 microns.

The polymers of this invention are water-soluble cationic vinylamine copolymers having recurring units of the general formula:

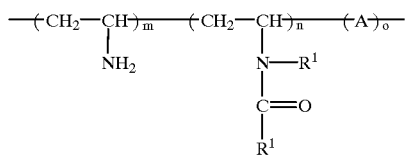

wherein m is from 1–99 mol %, n is from 0 to 50 mol % and o is from 1 to 99 mol %; A is selected from the group consisting of one or more repeating units having the following general structures:

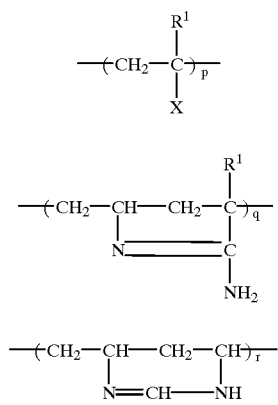

and salts thereof; wherein p is from 1 to 99 mol %, and q and r are 0 to 99 mol %, each $R^1$ is independently H or $CH_3$, and X is —CN, —$COOR^2$, —$CONR^3R^4$, —$OR^5$, —$OCOR^6$,

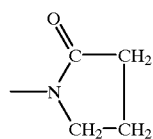

and mixtures thereof; wherein $R^2$, $R^3$, $R^4$, $R^5$, $R^6$ are independently selected from H or $C_1$ to $C_4$ alkyl; and wherein the vinylamine copolymers have a charge density in a range of from 2 to 24 mEq/g. The amine in the above copolymers can be in the form of the free amine or its ammonium salt. Typical anions in the ammonium salt form include, but are not limited to, $F^-$, $Cl^-$, $Br^-$, $I^-$, $HO^-$, $R^1COO^-$, and $R^1SO_4^-$ wherein $R^1$ is as defined above.

Methods for the preparation of N-vinylamide polymers are well known to those skilled in the art and include bulk polymerization, precipitation polymerization, solution polymerization or emulsion polymerization techniques. Aqueous solution polymerization in the presence of a water soluble free-radical initiator is preferred. The total monomer concentration is generally maintained in the range of 5 to 60% by weight, and is preferably maintained between 10 to 30% by weight. Suitable free-radical initiators include, but are not limited to, azo initiator, peroxide initiator, persulfate initiators and free-radical redox systems. Especially preferred are water-soluble azo initiators such as 2,2'-azobis(N,N'-dimethyleneisobutyramidine)dihydrochloride, 2,2'-azobis(2-amidinopropane)dihydrochloride, 4,4'-azobis-(4-cyanopentanoic acid), 2,2'-azobis{2-methyl-N-[1,1-bis(hydroxymethyl)-2-hydroxyethyl]propionamide}, and 2,2'-azobis[2-methyl-N-(2-hydroxyethyl)propionamide]. The free-radical initiator is usually used in an amount of 0.01 to 2 wt % based on the weight of the monomers. The polymerization reaction is usually carried out under an inert gas atmosphere at 30° to 100° C., preferably between 450 to 70° C.

The N-vinylamide polymers are then hydrolyzed, with an acid or a base, either partially or completely to provide a cationic charge density in the range of 2 to 24 mEq/g, preferably in the range of 2 to 20 mEq/g, most preferably in the range of 5 to 18 mEq/g as determined at pH 4.

In a first embodiment, the polymers of the invention may be prepared by first contacting, in the presence of a free radical initiator, an N-vinylamide monomer having the general formula:

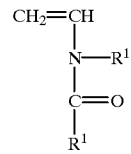

with a comonomer having the general formula:

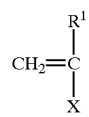

wherein each $R^1$ is independently H or $CH_3$ and

X is —CN, —$COOR^2$, —$CONR^3R^4$, —$OR^5$, —$OCOR^6$, or

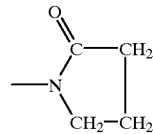

and mixtures thereof; wherein $R^2$, $R^3$, $R^4$, $R^5$, $R^6$ are independently selected from H or $C_1$ to $C_4$ alkyl.

The vinylamide copolymers are hydrolyzed with an acid or a base, either partially or completely to provide a cationic charge density in a range of from 2 to 24 mEq/g, forming vinylamine polymers having the following structure:

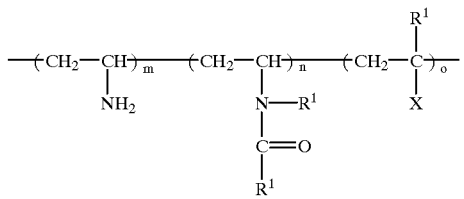

wherein m is from 1–99 mol %, n is from 0 to 50 mol % and o is from 1 to 99 mol %; and salts thereof; each $R^1$ is independently H or $CH_3$, and X is —CN, —COOR², —CONR³R⁴, —OR⁵, —OCOR⁶,

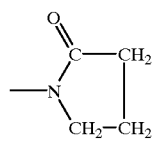

and mixtures thereof; wherein R², R³, R⁴, R⁵, R⁶ are independently selected from H or $C_1$ to $C_4$ alkyl.

When the N-vinylamide monomer is copolymerized with the above comonomer (structure i), it is preferred that the functional group X is —CONR³R⁴, —OR⁵, or —CN. When X is —CONR³R⁴, it is preferred that R³ is H, R⁴ is a tertiary butyl group and p is from 2 to 40 mol % or that R³ and R⁴ are H and m is at least 15 mol %. When X is —OR⁵, it is preferred that R⁵ is H and p is from 2 to 80 mol %.

When the N-vinylamide monomer is copolymerized with the above comonomer wherein X is CN, (i.e. when the comonomer is either acrylonitrile or methacrylonitrile), the resultant copolymer can be hydrolyzed to form a vinylamine copolymer having the following structure:

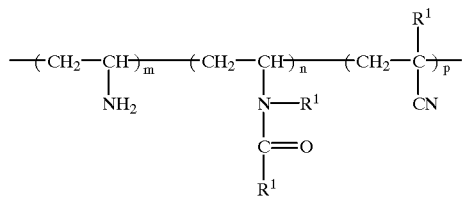

wherein m is from 1 to 99 mol %, n is from 0 to 50 mol %, and p is from 1 to 99 mol %.

The resultant vinylamine copolymer containing (meth) acrylonitrile repeating units may be further hydrolyzed to form acrylamide repeating units which may be further hydrolyzed to form (meth) acrylic acid repeating units or salts thereof. These copolymers and their methods of preparation are more fully disclosed in U.S. Pat. No. 4,957,977 which is incorporated herein in its entirety.

Alternatively, the above vinylamine/(meth) acrylonitrile copolymers may optionally be subjected to an amidinization reaction wherein the vinylamine groups are reacted with adjacent (meth) acrylonitrile groups to produce amidine repeating units. Those copolymers are characterized by the following structure:

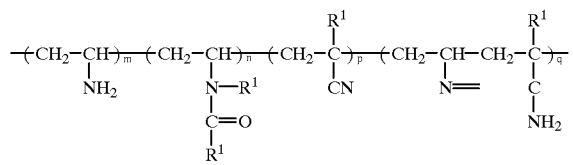

wherein m is from 1 to 99 mol %, n is from 0 to 50 mol % p is from 1 to 99 mol %, and q is from 0 to 99 mol %, preferably wherein m is from 1 to 90 mol %, n is from 0 to 2 mol %, p is from 0 to 60 mol % and q is from 20 to 90 mol %, most preferably wherein m is from 5 to 50 mol %, n is from 0 to 2 mol % p is from 5 to 50 mol %, and q is from 50 to 80 mol %. The amidinization reaction may be carried out by adding to the vinylamine copolymer 0.5 to 5.0 equivalents, preferably 1.0 to 3.0 equivalents, based on one equivalent of the substituted amino group in the copolymer, of a strong acid, preferably hydrochloric acid, and heating at a temperature of 80 to 150° C., for 0.5 to 20 hours, to produce a cationic polymer having an amidine unit. Generally, the amidinization reaction proceeds better and more completely with a larger equivalent ratio of strong acid relative to substituted amino groups and at higher reaction temperatures. In the amidinization reaction, water is generally present in the reaction system in an amount of 10% by weight or more, preferably 20% by weight or more, based on the copolymer to be subjected to the reaction. This reaction can be carried out directly or after dilution, i.e., in the form of a solution or suspension, or alternatively, the vinylamine copolymers may be treated so as to remove solvents therefrom in a known manner, dried to separate them as a solid, and then subjecting the copolymers to the amidinization reaction.

In addition to the foregoing procedures, the N-vinylamide copolymer may optionally be heated in water or an alcoholic solution in the presence of a strong acid or strong base to simultaneously hydrolyze and amidinize the N-vinylamide copolymer to produce the amidine structure in a single step. In this case, it is also believed that primary amino groups may be produced intermediately. These amidine-containing vinylamine copolymers and their method of preparation are more fully disclosed in European Patent No. 0,528,409 which is incorporated herein in its entirety.

In a second embodiment of the invention, the polymers may be prepared by heating N-vinylformamide in the presence of a free radical initiator to form poly(N-vinylformamide). This homopolymer is then thermodecarbonylated or hydrolyzed with an acidic or alkaline agent to directly produce monomeric repeating units of vinylamine and repeating units having the generalized amidine structure (iii), above wherein m is from 15 to 90 mol %, n is from 5 to 99 mol % and n is from 5 to 60 mol %. This process and the resultant polymers is more fully disclosed in U.S. Pat. Nos. 4,393,174 and 5,324,792, each of which is incorporated herein in its entirety.

The polymers of the invention generally have molecular weight of at least 10,000, and can be as high as 10 million. The molecular weight of vinylamine copolymers of this invention can be controlled by various factors including the particular method of polymerization, the polymerization temperature, the type and amount of initiator, the concentration of monomers and the like. In general, lower temperature and higher monomer concentration produce a higher molecular weight polymers while higher temperature and lower monomer concentration produce lower molecular weight polymers. However, due to solubility and handling considerations, the preferred copolymers generally have molecular weights in the range of from 100,000 to 5 million, most preferably in the range of 200,000 to 3 million.

The polymers and microparticles of this invention are generally prediluted in separate aqueous solutions which may then be added to an aqueous pulp suspension in any order and at any point in the papermaking process prior to the headbox, either before or after one of the several shear stages. Shear stages include the cleaning, mixing and/or pumping stage. Due to the relatively low molecular weight of the polymers of the invention, excessive shear of the drainage/retention in the aqueous pulp suspension is not essential for effective drainage/ retention. Best results are achieved when the polymer is added to thin stock rather than to thick stock, and the inorganic particle solution is added after the polymer solution. Typically, both components are added close to the head box prior to sheet formation.

The dosage amounts of polymer and microparticle added to the system can vary widely depending on the nature of the aqueous pulp suspension and the degree of drainage or retention desired. Those of ordinary skill in the art can readily determine appropriate dosage amounts by conventional techniques. Thus, the exact dosage amounts are not critical to the invention, per se, and are generally added in amounts effective to provide enhanced drainage or retention relative to the absence of these materials. Typical dosage amounts of polymers range from 0.005 to 0.5%, preferably from 0.01 to 0.3% and most preferably from 0.02 to 0.1% by weight on the basis of the weight of the dry pulp. Typical dosage amounts for microparticles range from 0.005 to 3%. When the microparticles are inorganic microparticles, they are preferably added in a dosage range of from 0.1% to 1.5%, most preferably from 0.2% to 1% by weight on the basis of the weight of the dry pulp. When the microparticles are organic microparticles, they are preferably added in a dosage range of from 0.01% to 1%, most preferably from 0.02% to 0.5% by weight on the basis of the weight of the dry pulp. In accordance with the present invention, the polymer solution and microparticle dispersions can also be added in several increments.

The drainage/retention aids of the present invention may optionally be used in combination with other paper making additives including but not limited to other water soluble polymers, enzymes, fillers, coagulants, including e.g., alum or other water soluble aluminum compounds, wet and dry strength additives, sizing agents, starches and the like, and mixtures thereof. Suitable enzymes include cellulolytic enzyme (e.g., cellulases and/or hemicellulases), glucose isomerase, e.g. derived from Streptomyces, Bacillus or Actinoplanes, Aminopeptidase, e.g. derived from Pseudomonas, Penicillin acylase, e.g. derived from Fusarium, Nitrilase, e.g. from Rhodococcus, from Pseudomonas or from Brevibacterium, Fructosyl transferase, e.g. from Aspergillus, Invertase, e.g. from Saccharomyces, Lactase, e.g. from Kluyveromyces, Cyanidase, e.g. from Alcaligenes, and mixtures thereof. These enzymes are more fully disclosed in U.S. Pat. Nos. 4,923,565, and 5,169,497 and International Publication Number WO 91/08287 which are incorporated herein by reference in their entirety.

The following examples are provided to illustrate the present invention in accordance with the principles of this invention in any way except as indicated in the appended claims. All parts and percentages are by weight unless otherwise indicated.

EXAMPLE 1

A 250 ml four-neck flask equipped with a stirrer, a condenser, a thermometer and a nitrogen gas inlet was charged with 20.47 g of N-vinyl formamide, 1.53 g of tert-butyl acrylamide, 0.088 g of 2,2'-azobis (N,N'-dimethyleneisobutyramidine) dihydrochloride and 100.13 g of deionized water. The solution was purged with nitrogen gas and then heated to 55° C. for 4 hours while stirring. Thereafter, the temperature of the solution was raised to 65° C. for another 2 hours to complete the reaction.

To 40.73 g of the resulting polymer solution was added 9.47 g of concentrated hydrochloric acid and 10.88 g of deionized water. The solution was heated to 80° C. for 8 hours under stirring. $^1$H-NMR measurement of this polymer indicated 90 mol % of vinylamine, 6 mol % of N-vinyl formamide and 4 mol % of tert-butyl acrylamide units in the polymer. The apparent weight-average molecular weight (Mw) was determined to be 228,000 by gel permeation chromatography (GPC) measurement.

EXAMPLE 2

A 250 ml polymerization flask was charged with 19.6 g of N-vinyl formamide, 3.05 g of tert-butyl acrylamide, 0.091 g of 2,2'-azobis(N,N'-dimethyleneisobutyramidine) dihydrochloride and 103.14 g of the deionized water. The solution was purged with nitrogen gas and then heated to 50° C. for 5 hours while stirring. Thereafter, the solution was heated to 60° C. for another 3 hours to complete the reaction.

To 41.98 g of the resulting polymer solution was added 9.08 g of concentrated hydrochloric acid and 11.91 of deionized water. The solution was heated to 80SC for 8 hours under stirring. Examination of the reaction product showed that it contained 86 mol % of vinylamine units, 6 mol % of N-vinyl formamide units and 8 mol % of tert-butyl acrylamide by NMR analysis and had a MW of 193,000 by GPC measurement.

EXAMPLE 3

This example demonstrates the effect of hydrolyzing a vinylamine copolymer on its apparent molecular weight. The apparent weight average molecular weight was determined by size exclusion chromatography. A non-hydrolyzed copolymer of N-vinylformamide (NVF) and t-butylacrylamide showed a weight-average molecular weight of 51,000. When this polymer was fully hydrolyzed, the apparent molecular weight was found to increase to 193,000. It is clear that the hydrolysis expanded the radius of gyrations of the polymer chain as indicated by the significant increase in the apparent molecular weight.

EXAMPLE 4

This example demonstrates the enhanced drainage exhibited by the compositions of the present invention. The effectiveness as drainage aids was determined using the Canadian freeness tester and a stock bleached kraft pulp suspension containing 30% calcium carbonate (chalk) as filler. The pH of the pulp suspension was 8, with a solids concentration (consistency) of 0.48%. In the drainage test, 1 liter stock was used and polymer and an inorganic microparticle (bentonite) was added in sequence to the stock. The liquid volume collected from the tester was reported as freeness in milliliters. Tests 2 to 4 involved the drainage/retention aids of the present invention, tests 5 and 6 are based on the drainage/ retention aids of EP 235893. The combination of vinylamine copolymers and microparticles exhibited a surprising synergistic effect which was more effective than all other systems tested.

TABLE 1

| | Drainage Test | | |
|---|---|---|---|
| | | Freeness (ml) | |
| Test | System | 0.05% Polymer | 0.05% Polymer 0.3% Inorganic Microparticle |
| 1 | blank | | 440 |
| 2 | Polymer A | 500 | 580 |
| 3 | Polymer B | 490 | 600 |
| 4 | Polymer C | 480 | 590 |
| 5 | Polymer D | 440 | 510 |
| 6 | Polymer E | 430 | 490 |
| 7 | Polymer F | 490 | 430 |
| 8 | Polymer G | 410 | 460 |
| 9 | Polymer H | 420 | 580 |

Polymer A is a hydrolyzed copolymer of NVF and acrylonitrile

Polymer B is a hydrolyzed copolymer of NVF and t-butyl acrylamide from Example 1

Polymer C is a hydrolyzed copolymer of NVF and t-butyl acrylamide from Example 2

Polymer D is a high M.W. cationic polyacrylamide with molecular weight above one million Polymer E is a high M.W. cationic polyacrylamide with molecular weight above one million Polymer F is a polydiallyl dimethyl ammonium chloride polymer (Agefloc PC2206)

Polymer G is polyethyleneimine (Polymin SK)

Polymer H is a hydrolyzed homopolymer of NVF

EXAMPLE 5

This example demonstrates a drainage test using a pulp suspension similar to that of Example 4. The pH of the pulp suspension was 8.2, with consistency of 0.48%. Tests 11 and 12 are based on U.S. Pat. No. 5,098,521 system. It is clear that the improvement in freeness by the U.S. Pat. No. 5,098,521 system is less than that of the invention system described in Example 4.

TABLE 2

Drainage Test

| Test | System | Freeness (ml) |
|---|---|---|
| 10 | blank | 390 |
| 11 | AA | 420 |
| 12 | BB | 405 |

System AA comprises a combination of 0.06% polymer G, 0.02% polymer E and 0.5% inorganic microparticle (bentonite), System BB comprises a combination of 0.06% polyethyleneimine, 0.02% polymer E and 0.5% inorganic microparticle (bentonite).

EXAMPLE 6

This example demonstrates the effectiveness of the polymers and microparticles of the present invention for enhancing retention in a bleached kraft pulp suspension with consistency around 0.5% and pH 5. This experiment used a standard dynamic Britt jar test for measuring retention. The first pass retention results are reported in Table 3. The microparticle used in this example was bentonite.

TABLE 3

| Tests | Polymers | 0.06% Polymer | 0.06% Polymer +0.3% Inorganic Microparticle |
|---|---|---|---|
| 13 | Polymer A | 72.6% | 91.8% |
| 14 | Polymer B | 71% | 85.9% |
| 15 | Polymer C | 66.6% | 86.6% |
| 16 | Polymer F | 99% | 84.2% |
| 17 | Polymer G | 76% | 79.5% |
| 18 | Polymer H | 67.5% | 87.6% |
| 19 | No Polymer | | 73.6% |

EXAMPLE 7

The procedure in Example 6 was repeated using a bleached kraft pulp suspension, containing 30% precipitated calcium carbonate, with consistency around 0.5% and pH 8. The first pass retention results are reported in Table 4.

TABLE 4

| Tests | Polymers | 0.06% Polymer | 0.06% Polymer +0.3% Inorganic Microparticle |
|---|---|---|---|
| 20 | Polymer A | 59.6% | 90.1% |
| 21 | Polymer B | 91.7% | 97.1% |
| 22 | Polymer C | 86.5% | 91.6% |
| 23 | Polymer D | 76.8% | 94.4% |
| 24 | Polymer E | 37.3% | 43.3% |
| 25 | Polymer F | 15.7% | 21.1% |
| 26 | Polymer H | 64.7% | 90.9% |
| 27 | No Polymer | | 20.5% |

EXAMPLE 8

This example demonstrates the unexpected synergism between a hydrolyzed copolymer of NVF and acrylonitrile (polymer A) and an organic microparticle (Polyflex CP is a polymeric particulate commercially available from Cytec) as a drainage aid. The pulp slurry tested was a bleached kraft containing 30% precipitate calcium carbonate. 0.03% (on dry paper weight base) polymer A was added to the stock with and without the addition of organi microparticle.

TABLE 5

| Organic microparticle concentration | 0% | 0.03% |
|---|---|---|
| Freeness (ml) | 495 | 584 |

EXAMPLE 9

(Comparative)

The procedure in Example 8 was repeated using 0.03% polymer D with and without an organic microparticle.

TABLE 6

| Organic microparticle concentration | 0% | 0.03% |
|---|---|---|
| Freeness (ml) | 450 | 475 |

EXAMPLE 10

(Comparative)

The procedure in Example 8 was repeated using 0.03% polymer A with and without an inorganic microparticle (bentonite).

TABLE 7

| Inorganic microparticle concentration | 0% | 0.03% |
|---|---|---|
| Freeness (ml) | 495 | 520 |

EXAMPLE 11

This example demonstrates the unexpected synergism between vinylamine (VAm)-containing copolymers (polymer A and I) and an organic microparticle (Polyflex CP) on filler retention. Polymer I is a copolymer containing NVF, VAm and repeating units of amidine (structure iii). The pulp slurry tested was a bleached kraft containing 30% natural calcium carbonate (chalk). The polymer was first added to the stock, followed by the addition of the microparticle at different concentration levels. The first pas retention is shown in Table 8.

TABLE 8

| Organic microparticle Concentration | 0% | 0.01% | 0.03% | 0.06% |
|---|---|---|---|---|
| Polymer A | 53% | 93% | 96% | 95% |
| Polymer I | 46% | 86% | 95% | 96% |

EXAMPLE 12

(Comparative)

Retention tests similar to Example 11 were carried out using polymer D and Polyflex CP.

TABLE 9

| Organic microparticle Concentration | 0% | 0.01% | 0.03% | 0.06% |
|---|---|---|---|---|
| Polymer D | 47% | 64% | 63% | 63% |

What is claimed is:

1. A method of preparing paper or paper board from an aqueous pulp suspension comprising adding to the pulp suspension a drainage/retention aid comprising:

a) microparticles; and
b) a vinylamine copolymer having the general formula

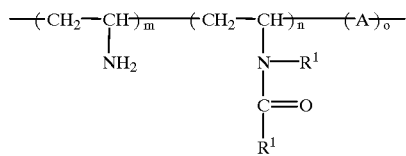

wherein m is from 1 to 99 mol %, n is from 0 to 50 mol % and o is from 1 to 99 mol %; A is selected from the group consisting of one or more repeating units having the following general structures:

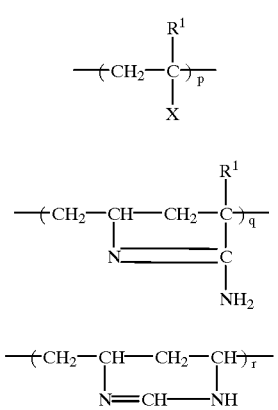

and salts thereof wherein p, q and r are mol percentages from 1 to 99, each $R^1$ is independently H or $CH_3$, and

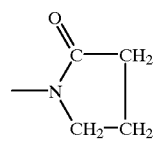

and mixtures thereof, wherein $R^2$, $R^3$, $R^4$, $R^5$, $R^6$ are independently selected from H or C, to $C_4$ alkyl; and wherein the vinylamine copolymer has a charge density in a range of from 2 to 24 mEq/g.

2. A method according to claim 1 wherein the copolymer is added to the aqueous pulp suspension in a dosage range from 0.005% to 0.5% by weight on the basis of the weight of the dry pulp.

3. A method according to claim 1 wherein the copolymer is added to the aqueous pulp suspension in a dosage range from 0.01 to 0.3% by weight on the basis of-the weight of the dry pulp.

4. A method according to claim 1 wherein the copolymer is added to the aqueous pulp suspension in a dosage range of from 0.02 to 0.1% by weight on the basis of the weight of the dry pulp.

5. A method according to claim 1 wherein the microparticles are added to the aqueous pulp suspension in a dosage range of from 0.005% to 3% by weight on the basis of the weight of the dry pulp.

6. A method according to claim 1 wherein the microparticles are inorganic microparticles and are added to the aqueous pulp suspension in a dosage range of from 0.1% to 1.5% by weight on the basis of the weight of the dry pulp.

7. A method according to claim 1 wherein the microparticles are inorganic microparticles and are added to the aqueous pulp suspension in a dosage range of from 0.2% to 1% by weight on the basis of the weight of the dry pulp.

8. A method according to claim 1 wherein the microparticles are organic microparticles and are added to the aqueous pulp suspension in a dosage range of from 0.01% to 1% by weight on the basis of the weight of the dry pulp.

9. A method according to claim 1 wherein the microparticles are organic microparticles and are added to the aqueous pulp suspension in a dosage range of from 0.2% to 0.5% by weight on the basis of the weight of the dry pulp.

10. A method according to claim 1 which further comprises adding to the aqueous pulp suspension one or more additives selected from the group consisting of water soluble polymers, enzymes, fillers, coagulants, wet strength additives, dry strength additives, sizing agents, starches and mixtures thereof.

11. A paper or paperboard product containing a drainage/retention aid comprising:

a) microparticles; and
b) a vinylamine copolymer having the general structure:

$$-(CH_2-CH)_m-(CH_2-CH)_n-(A)_o-$$
$$\qquad\quad |\qquad\qquad\quad |$$
$$\qquad\ NH_2\qquad\qquad N-R^1$$
$$\qquad\qquad\qquad\qquad\quad |$$
$$\qquad\qquad\qquad\qquad\ C=O$$
$$\qquad\qquad\qquad\qquad\quad |$$
$$\qquad\qquad\qquad\qquad\ R^1$$

wherein m is from 1–99 mol %, n is from 0 to 50 mol % and o is from 1 to 99 mol %; A is selected from the group consisting of one or more repeating units having the following general structures:

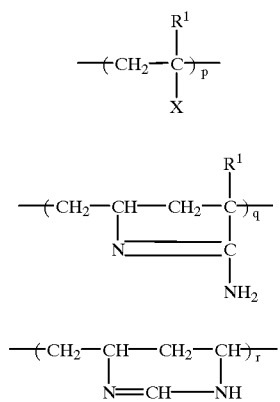

(i), (ii), (iii)

and salts thereof wherein p, q and r are mol percentages from 1 to 99, each $R^1$ is independently H or CH3, and X is —CN, —COOR$^2$, —CONR$^3$R$^4$, —OR$^5$, —OCOR$^6$,

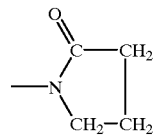

and mixtures thereof; wherein $R^2$, $R^3$, $R^4$, $R^5$, $R^6$ are independently selected from H or $C_1$ to $C_4$ alkyl; and wherein the vinylamine copolymer has a charge density in a range of from 2 to 24 mEq/g.

12. A method according to claim 1 wherein the pulp suspension comprises anionic components and the microparticles have a surface charge density sufficient to interact with the vinylamine copolymer or the anionic components in the pulp suspension.

13. A method according to claim 1 wherein the microparticles have an anionic charge.

* * * * *